ID[19]

United States Patent
Averbach et al.

[11] Patent Number: 5,518,820
[45] Date of Patent: May 21, 1996

[54] CASE-HARDENED TITANIUM ALUMINIDE BEARING

[75] Inventors: Benjamin L. Averbach, deceased, late of Belmont, Mass., by Gertrude M. Averbach, Executrix; Jon C. Schaeffer, Milford; Mark A. Rhoads, Cincinnati, both of Ohio; Joseph A. Heaney, III, Forest, Va.

[73] Assignee: General Electric Company, Cincinnati, Ohio

[21] Appl. No.: 899,562

[22] Filed: Jun. 16, 1992

[51] Int. Cl.$^6$ .............................. B32B 15/04; F16C 33/00
[52] U.S. Cl. .............................. 428/469; 384/23; 384/95; 384/125; 384/261; 384/492; 384/615; 384/912; 428/457; 428/698; 428/701; 428/704
[58] Field of Search ...................................... 428/627, 610, 428/650, 660, 469, 704, 457, 701, 698; 148/217, 218, 237, 316, 317, 906; 384/23, 95, 125, 261, 615, 492, 912

[56] References Cited

U.S. PATENT DOCUMENTS

| | | | |
|---|---|---|---|
| 3,212,834 | 10/1965 | Mayer et al. | 308/241 |
| 3,656,995 | 4/1972 | Reedy, Jr. | 148/237 |
| 4,157,923 | 6/1979 | Yen et al. | 148/4 |
| 4,471,032 | 9/1984 | Fukuoka et al. | 148/417 |
| 4,511,411 | 4/1985 | Brunner et al. | 148/237 |
| 4,788,035 | 11/1988 | Gigliotti, Jr. et al. | 148/421 |
| 4,908,072 | 3/1990 | Taki et al. | 148/218 |
| 4,915,903 | 4/1990 | Brupbacher et al. | 420/129 |
| 4,916,029 | 4/1990 | Nagle et al. | 428/614 |
| 5,137,374 | 8/1992 | Orkin | 384/912 |
| 5,145,530 | 9/1992 | Cassady | 148/565 |
| 5,149,497 | 9/1992 | McKee et al. | 148/421 |
| 5,161,898 | 11/1992 | Drake | 384/95 |

FOREIGN PATENT DOCUMENTS

| | | |
|---|---|---|
| 2153218 | 10/1971 | Germany . |
| 60-056061 | 4/1985 | Japan . |
| 61-155687 | 7/1986 | Japan . |
| 1232153 | 12/1989 | Japan . |
| 3075385 | 3/1991 | Japan . |
| 3180479 | 8/1991 | Japan . |
| 90232067 | 2/1990 | WIPO . |

Primary Examiner—A. A. Turner
Attorney, Agent, or Firm—Andrew C. Hess; David L. Narciso

[57] ABSTRACT

A bearing includes a bearing component, such as a bearing race, having a bearing contact surface. A region at the bearing contact surface is made of titanium aluminide, preferably an alpha-2 or gamma titanium aluminide. A case-hardened layer present at the surface of the titanium aluminide region increases the hardness and wear resistance of the titanium aluminide at elevated temperature. The case-hardened layer is preferably formed by diffusing carbon into the surface of the titanium aluminide from a gaseous medium, at elevated temperature 1and at ambient or reduced pressure.

19 Claims, 3 Drawing Sheets

5,518,820

CASE-HARDENED TITANIUM ALUMINIDE BEARING

BACKGROUND OF THE INVENTION

This invention relates to bearings, and, more particularly, to bearings used at elevated temperatures and in adverse environments.

In a gas turbine (also sometimes termed a "jet") engine, air is drawn into the front of the engine and compressed by a shaft-mounted compressor. The compressed air is mixed with fuel, and the mixture is burned in a combustor. The resulting hot exhaust gases are passed through a turbine that is mounted on the same shaft as the compressor, and then flow out of the rear of the engine. The rotation of the turbine causes the main shaft to turn, powering the compressor.

The main shaft upon which the compressor and turbine are mounted is supported on several sets of bearings. Although they are not exposed to the extremely high temperatures experienced by the turbine blades and vanes, these bearings are subjected to intermediate service temperatures of up to about 350° F. in current engines.

The contact surfaces of the bearings must have high hardness, wear resistance, strength, and fracture toughness, at the service temperature of the bearings. The bearings are currently made of specialty tool steels such an M5O steel, which meet the indicated requirements at temperatures of up to about 600° F. At higher temperatures, however, the bearings suffer reductions in these properties as well as increased susceptibility to environmental damage such as oxidation and corrosion. It is also difficult to maintain tolerances at the higher temperatures, due to thermal expansion mismatch between the bearing material and the shaft material.

There is an economic incentive to develop gas turbine engines that operate at ever-higher temperatures, because the fuel efficiency of the engine increases with increasing combustion gas temperatures. As the operating temperature of the engine is increased due to innovations in the design and materials used in the turbines and other hot-section components, it is desirable to operate the main shaft and its bearings at ever-higher temperatures, to reduce the need for excessive cooling of components within the engine and to permit innovations in shaft and bearing design.

There is therefore a continuing need for improved bearing materials for use at elevated temperatures in jet engines, as well as other applications. The present invention fulfills this need.

SUMMARY OF THE INVENTION

This invention provides an improved bearing and bearing material that may be used at temperatures much higher than possible with conventional bearings, up to about 1550° F. The bearing has good mechanical and physical properties, and additionally is substantially lighter than conventional bearings. In many applications, the bearing of the invention replaces a conventional bearing without requiring any changes to the supported component. The bearing is manufactured by established techniques.

In accordance with the invention, a bearing comprises a bearing component having a bearing contact surface, a region at the bearing contact surface made of titanium aluminide, and a case-hardened layer at the surface of the titanium aluminide region. The contact surface of the bearing component is made of a material having properties intermediate between those of metals and ceramics, a titanium aluminide. However, the titanium aluminide itself does not have the required hardness and wear resistance to provide a satisfactory contact surface. The contact surface is therefore case hardened, preferably by diffusion of an interstitial alloying element into the surface of the titanium aluminide, to increase its hardness and wear resistance. As used herein, the term interstitial alloying element includes carbon, nitrogen, oxygen, boron, hydrogen and combinations thereof.

A critical aspect of the present approach is the use of surface-modified titanium aluminides at the contact surface of a bearing. Titanium aluminides are a class of intermetallic compounds based upon alloys of titanium, aluminum, and other elements. Two titanium aluminides of particular interest are gamma titanium aluminide (near TiAl in composition) and alpha-2 titanium aluminide (near $Ti_3Al$ in composition). These materials are of relatively low density, being based upon the light elements titanium and aluminum, and of excellent specific modulus and strength at intermediate temperatures.

The titanium aluminides have properties intermediate those of metals and ceramics. They exhibit good elevated temperature properties characteristic of ceramics, but also have some degree of ductility characteristic of metals. This ductility is important, inasmuch as the ductility imparts fracture toughness, resistance to crack propagation, and resistance to thermal shock. The titanium aluminides also have coefficients of thermal expansion that are relatively low as compared with most metallic structural materials, which also contributes to reduced susceptibility to thermal shock damage. For applications where the supporting or supported structures are made of titanium aluminides, a bearing made of titanium aluminide provides an excellent match in thermal expansion behavior.

The titanium aluminides fall short of bearing contact-surface requirements for hardness and wear resistance. However, a surface hardening treatment has been shown to increase the hardness and wear resistance to a sufficiently high value for the bearing contact surface application.

It is preferred to harden the surface of the titanium aluminide by elevated temperature diffusion of hardening elements into the titanium aluminide from a gaseous atmosphere. In one approach, a bearing component having a titanium aluminide contact surface is exposed to a carbon-containing gas at reduced pressure and at elevated temperature for a time sufficient to permit the carbon to diffuse into the surface of the titanium aluminide to form a case-hardened layer at least about 0.010, and preferably 0.020–0.030, inches thick. The mixture of gases is selected so that carbon enters the titanium aluminide, but does not form a carbon layer on its surface. In another approach, generally the same process is followed, except that the carburizing gas is at ambient pressure.

The present approach provides an important advance in the art of bearings for use at elevated temperatures. The bearing material selected, titanium aluminide, has good physical and mechanical properties except for hardness and wear resistance, and surface hardness and wear resistance can be achieved through case hardening.

DETAILED DESCRIPTION OF THE INVENTION

Figure 1:
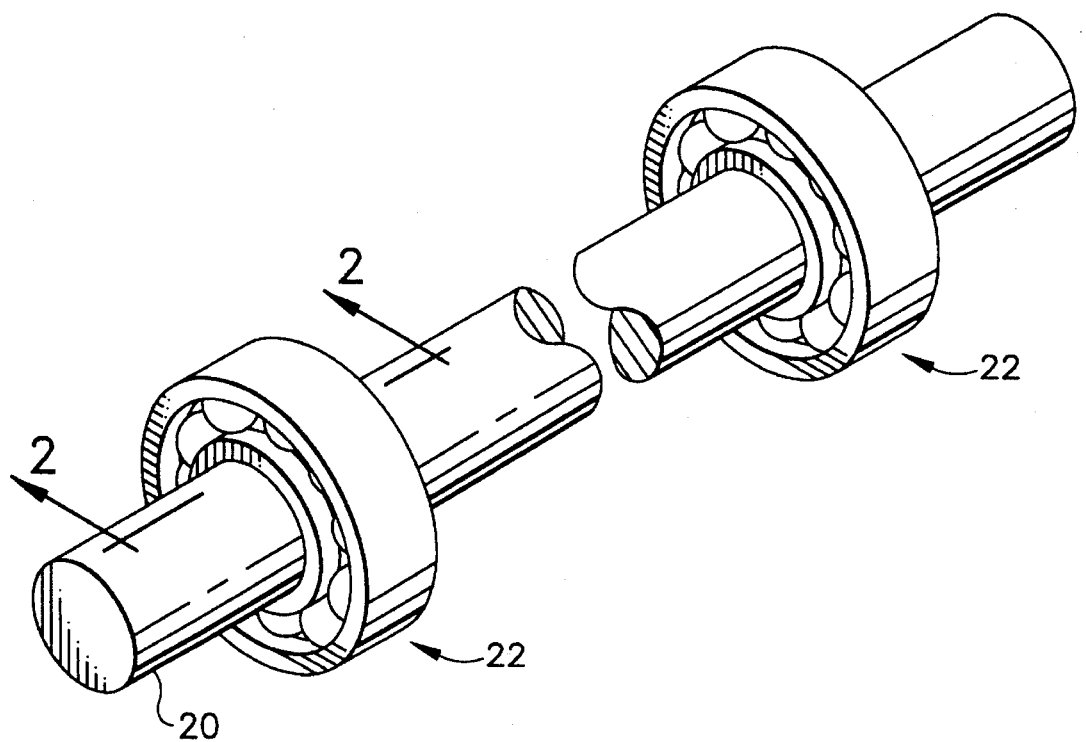
FIG. 1 is a perspective view of a shaft supported on bearings.

FIG. 1 illustrates a shaft 20 having several bearings 22 that are used to support the shaft 20 from a support structure 24 so that the shaft 20 can turn about its cylindrical axis. The use of bearings 22 to support the main shaft of a gas turbine engine is the principal interest of the present inventors, but bearings are used in thousands of other applications to support two structures that move relative to each other by rotation, sliding, etc. The present approach is applicable to these other bearing applications as well.

Figure 2:
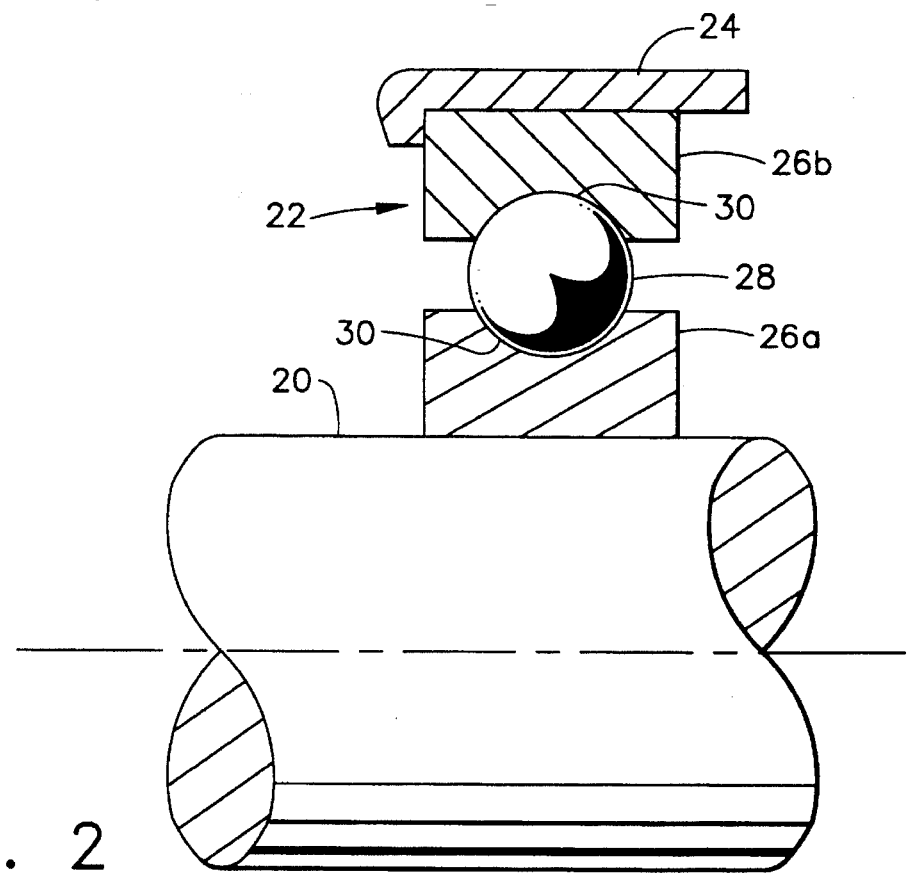
FIG. 2 is an enlarged circumferential sectional view of one of the bearings of FIG. 1, taken along line 2—2.

FIG. 2 depicts the bearing 22 in section. A bearing 22 includes at least one, and usually two, races 26. In the present structure two races of generally U-shape are used. The bearing includes two races 26. One of the races 26a is fastened to the shaft 20, and the other race 26b is fastened to the support structure 24, in a facing opposed relationship. A rolling element, in this case a ball 28, is placed between the races 26 so that the ball 28 rolls on a contact surface 30 of each race 26. In practice, a large number of rolling elements is used, filling the space between the races around the circumference of the bearing. The bearing depicted in FIG. 2 is a relatively uncomplicated design, and many other bearing configurations are used for specific applications. The present invention deals with the construction of the bearing rather than its configuration, and is applicable for any configuration of bearing.

Figure 3:
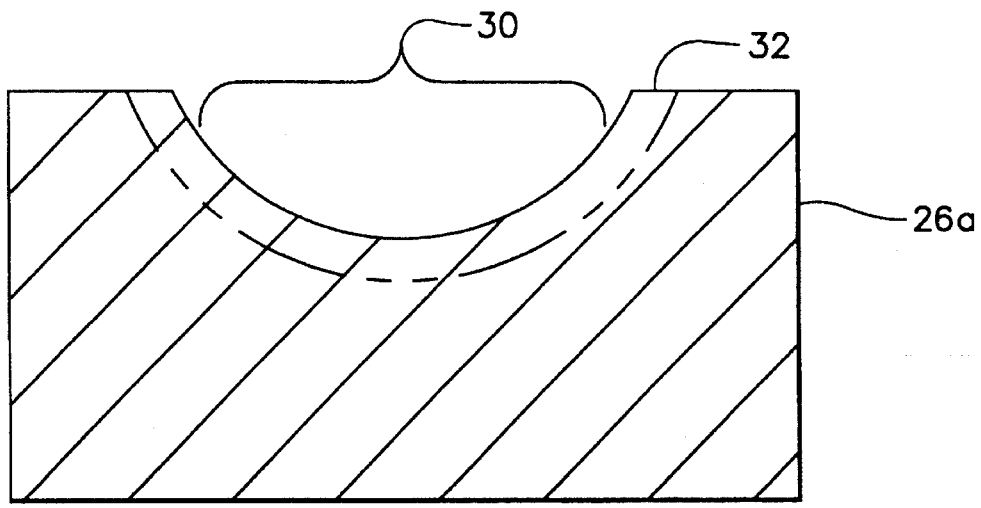
FIG. 3 is a further enlarged view of a detail of FIG. 2, illustrating the surface of the bearing race.

The material of construction of the bearing 22 generally and more specifically the contact surface 30 are important to its successful operation. FIG. 3 is an enlarged sectional view of the bearing race 26. The presently preferred application of the present invention is in the race 26, but it also may be used in the rolling element or ball 28.

The bearing race 26 is made of a titanium aluminide, which is a composition formed of the metallic elements titanium and aluminum, and possibly other metallic elements. Titanium aluminides of most interest are (1) gamma titanium aluminide, which has a composition near the equiatomic TiAl composition, (2) alloys of gamma titanium aluminide, (3) alpha-2 titanium aluminide, which has a composition near $Ti_3Al$, and (4) alloys of alpha-2 titanium aluminide. As used herein, the phrase "which has a composition near" and the like are used to indicate that the composition is within the stated phase field, i.e., gamma or alpha-2, and may be exactly the stoichiometric composition or varied slightly through the Ti/Al ratio. An "alloy" is a modification of the basic indicated composition with the addition of other metallic elements such as, for example, niobium, chromium, tantalum, molybdenum, cobalt, tungsten, zirconium, boron, silicon and vanadium. These alloying elements are added to achieve properties improved over those of the unalloyed titanium aluminide. The term "titanium aluminide" is intended to encompass all such compositions and modifications.

Titanium aluminides have generally desirable mechanical and physical properties, including good elevated temperature strength, toughness, oxidation resistance, etc. They do not have acceptable hardness and wear resistance for use at the contact surface 30, of either a bearing race or a bearing rolling element.

The contact surface 30 of the titanium aluminide bearing race 26 is modified by case hardening, as shown in FIG. 3. One or more interstitial alloying elements that increase the hardness and wear resistance of the titanium aluminide are added at the contact surface 30 to form a case-hardened layer 32, thereby preferentially increasing its hardness, wear resistance and rolling contact fatigue life. The provision of a surface layer 32 is to be distinguished from the addition of a hardening or strengthening element throughout the volume of the bearing component. When such an element is added throughout the entire volume of the bearing component, its hardness is increased but its elongation and toughness are decreased. That decrease throughout the entire volume is undesirable, as it increases the sensitivity of the bearing component to premature failure. In the present approach, the interior of the bearing component retains its good toughness, while the surface layer is preferentially hardened to provide a hard wear-resistant contact surface.

Figure 4:
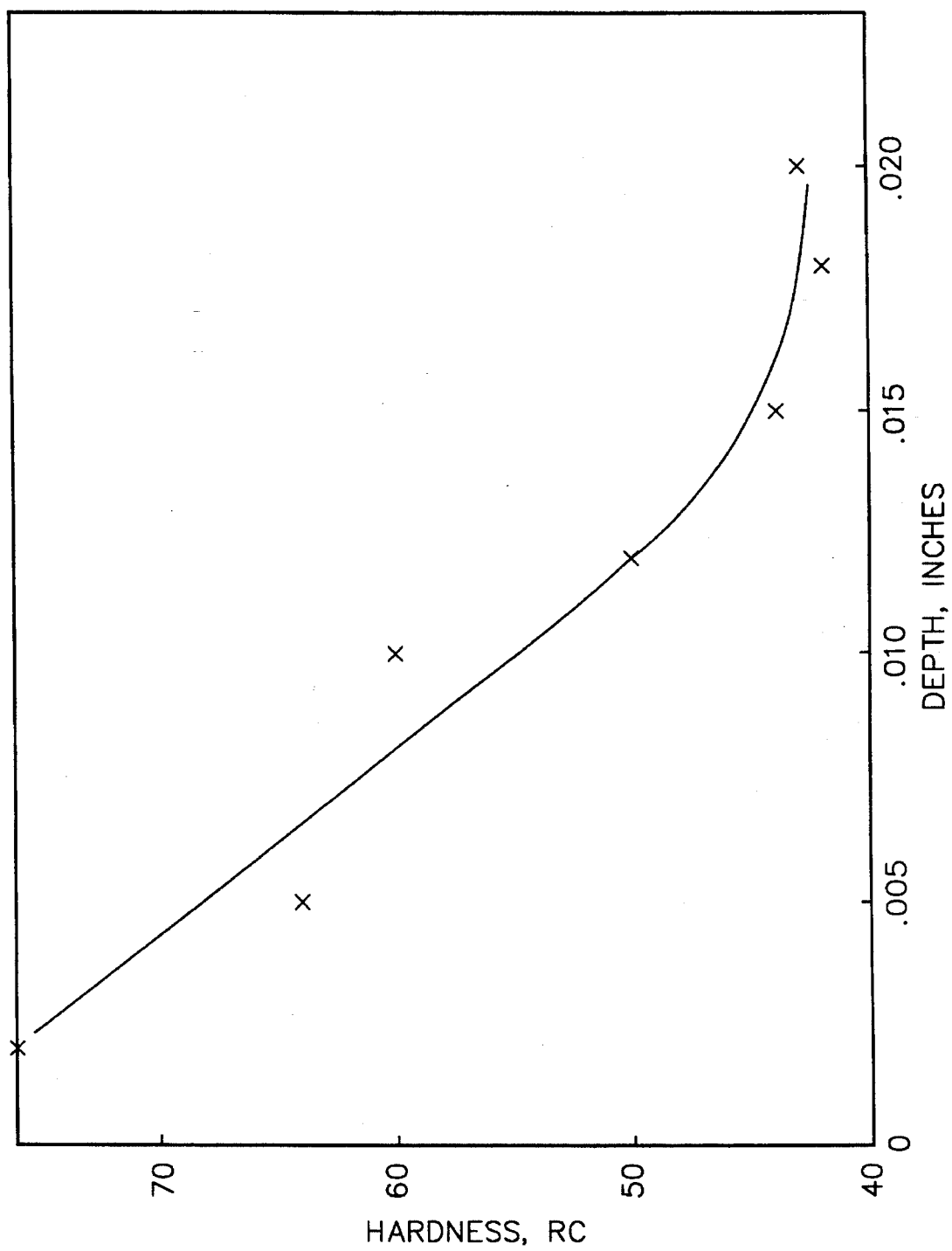
FIG. 4 is a graph of hardness as a function of depth for a test sample.

The surface treatment used to case harden the surface layer 32 produces a variation of hardness with depth, with the greatest hardness nearest the surface. FIG. 4 is a graph of hardness as a function of depth for a piece of an alpha-2 titanium aluminide alloy processed in a manner to be described subsequently. The hardness of the case-hardened titanium aluminide is at least about 60 Rc (Rockwell C), and preferably as high as 77 Rc, just below the surface, and gradually decreases to about 42 Rc at a distance below the surface of about 0.015–0.020 inch. The hardness of 42 Rc is that of the unmodified alpha-2 titanium aluminide used in the study. Thus, the case-hardened layer 32 has properties which vary through the thickness of the layer, which is intentionally within the scope of the invention.

The case-hardened layer 32 desirably has a thickness of at least 0.010 inches, and preferably a thickness of 0.010–0.030 inches. For lesser thicknesses, the normal wear of the surface may wear away the layer 32 down to the unhardened titanium aluminide, leading to premature failure. For greater thicknesses, the layer 32 of lesser toughness extends too far into the interior of the bearing component, and can reduce the overall toughness of the bearing component. The thickness of the case-hardened layer can be selected for various applications, and the case-hardening process varied to produce the desired thickness. Generally, greater temperatures and times of case hardening lead to greater thicknesses of the case-hardened layer 32.

Figure 5:
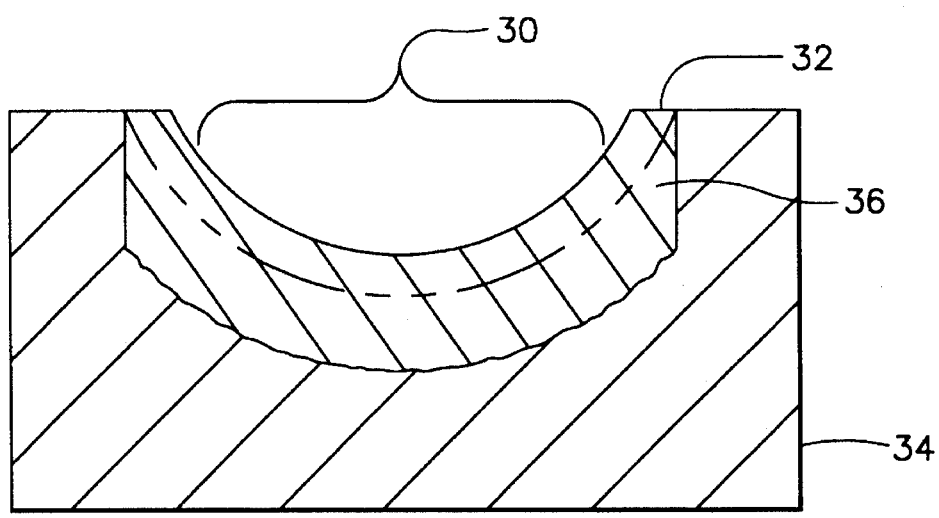
FIG. 5 is a view similar to that of FIG. 3, except that the titanium aluminide is provided as a layer on the surface of a bearing substrate.

In the preferred approach, the entire bearing component, such as the race 26, is made of the titanium aluminide. An alternative approach is illustrated in FIG. 5. Here, a substrate 34 generally of the form of the bearing race 26 is provided. The substrate 34 may be made of any acceptable material. A titanium aluminide layer 36 is deposited overlying the substrate 34. The surface of the titanium aluminide layer 36 is case hardened, as described herein, to form the case-hardened layer 32 comparable with that illustrated in FIG. 3. This approach permits the body of the bearing to be made of some desirable material, with a layered structure of case-hardened titanium aluminide applied at selected locations as might be desirable. In a typical example of the use of this alternative, only the contact surface 30 region would have the titanium aluminide layer applied and then case hardened.

Returning to the preferred embodiment of FIG. 3, the case-hardening treatment may be accomplished by any operable procedure. The preferred approach is to place the titanium aluminide bearing component into an atmosphere containing one or more interstitial alloying elements at elevated temperature. The interstitial species is deposited onto the surface of the bearing component and diffuses into the bearing component. Interstitially diffusing elements such as carbon, nitrogen, oxygen, boron, hydrogen and combinations thereof are preferred, because they diffuse relatively rapidly. Although this discussion emphasizes the use of these interstitial alloying elements as surface hardening elements, it must be recognized that other hardening elements may also be used. A commercial carburizing atmosphere, such as might be used for carburizing steels, is effective for the present invention.

Two techniques have been utilized to case harden the titanium aluminide bearing component. In one, the case hardening gaseous environment was maintained at a pressure below ambient pressure and a relatively high temperature was used. The titanium aluminide to be case hardened is first vapor honed or sanded to remove oxides and debris from the surface, and then rinsed in acetone and methanol to degrease the surface. According to a preferred form of this approach, the bearing component is heated to a temperature of about 2000°–2200° F. in a flowing carburizing atmosphere of from about 5 to about 380 Torr. The heat treatment time is as necessary to attain the desired thickness of the layer 32, but is typically about 2–20 hours. After the treatment is complete, the furnace is cooled under the heat-treatment atmosphere. A range of atmospheres have been used, including 5:1, 8:1, and 24:1 mixtures of hydrogen and methane, a 250:1 mixture of carbon monoxide and carbon dioxide, and a 180:10:1 mixture of carbon monoxide, nitrogen, and carbon dioxide. (The mixtures are specified as molar mixtures of the gases.) The atmospheres are chosen so that the carbon potential in the mixture is greater than that in the titanium aluminide but less than that required to form a continuous carbide layer on the surface.

A number of evaluation studies were performed using samples of number of titanium aluminide materials. Samples of 8 different titanium aluminides, having the compositions given in Table 1 and identified as Alloys A through H, were prepared, and samples of about 1–2 cubic centimeters in size were given the case hardening treatments discussed previously. Table 1 presents the results of one of the evaluations, for the 180:10:1 carbon monoxide, nitrogen, carbon dioxide atmosphere at a pressure of 380 Torr, a temperature of 2100° F., and an exposure time of 20 hours. These case hardening conditions are identified as Example 1. The last column of the table gives the normalized weight gain of each specimen resulting from the treatment in milligrams per square centimeter. The greater the weight gain, the more hardening element has diffused into the surface of the specimen. The weight gain thus is an indicator of the ease with which the particular alloy may be treated according to the present approach.

TABLE I

| Alloy | Composition, at. % | | | | | | Wt. Gain |
|---|---|---|---|---|---|---|---|
| | Al | Nb | Cr | Ta | Mo | Ti | mg/sq. cm |
| A | 24.5 | 12.5 | | | 1.5 | bal. | 14.25 |
| B | 24 | 11 | | | | bal. | 30.64 |
| C | 48 | 2 | 2 | | | bal. | 1.54 |
| D | 47 | | 2 | 4 | | bal. | 2.11 |
| E | 48 | 1 | | 3 | | bal. | 3.22 |
| F | 48 | 1 | 4 | 8 | | bal. | 2.68 |
| G | 52 | 1 | | 8 | | bal. | 1.98 |

TABLE I-continued

| Alloy | Composition, at. % | | | | | | Wt. Gain |
|---|---|---|---|---|---|---|---|
| | Al | Nb | Cr | Ta | Mo | Ti | mg/sq. cm |
| H | 52 | 1 | 4 | 3 | | bal. | 4.13 |

All of the titanium aluminides tested were susceptible to treatment by the present approach. Alloy B, an alpha-2 titanium aluminide alloy, had the greatest normalized weight gain produced by the treatment.

In a second approach, identified herein as Example 2, the titanium aluminide is first preoxidized, and then case hardened at elevated temperature and ambient pressure. The Ti-24Al-11Nb alloy was first preoxidized at a temperature of 2000° F. for a period of 3 hours in air. It was thereafter placed into an atmosphere comprised of carbon monoxide, carbon dioxide, methane, hydrogen, water vapor and nitrogen at ambient pressure and 1750° F. for 90 hours. The carbon potential of the atmosphere, which quantifies the ability of the atmosphere to carburize steel, was 0.4 percent carbon, as measured on AISI 1005 steel. The specimen was sectioned, and the hardness of the case-hardened layer 32 was measured as a function of distance below the surface. The results are presented in FIG. 4, and Table 2. The depth of the layer 32 is between 0.010 and 0.020 inches, and could be increased by the use of greater temperature and/or longer exposure time.

TABLE 2

| | Alloy and Case Hardening Treatment | | | |
|---|---|---|---|---|
| Depth below Surface, mils | A Ex. 1 | B Ex. 2 | B Ex. 3 | A Ex. 4 |
| | ← Hardness, Rc → | | | |
| 2 | 61 | 65 | 76 | 46 |
| 4 | 59 | 57 | | 45 |
| 5 | | | 64 | |
| 6 | 52 | 51 | | 43 |
| 8 | 50 | 44 | | 40 |
| 10 | 50 | 28 | 60 | 37 |
| 12 | | 26 | 50 | |
| 15 | 46 | | 44 | |
| 18 | | | 42 | |
| 20 | 44 | 26 | 43 | |
| 25 | 43 | | | |

In Example 3, the case hardening treatment comprised carburizing at ambient pressure for 16 hours at 2100° F. in an atmosphere similar to Example 2, except having a carbon potential of 0.15 percent carbon. No preoxidation was employed in Example 3.

In Example 4, the case hardening treatment comprised carburizing at a pressure of 8 Torr for 20 hours at 2100° F. in a 24:1 mixture of hydrogen and methane. No preoxidation was employed in Example 4.

The combination of Alloy A with case hardening treatment Example 1 is considered to be the preferred embodiment of the invention.

The present approach provides a bearing component that is operable at elevated temperatures, with good mechanical, physical, and hardness/wear resistance properties. It will be understood that various changes and modifications not specifically referred to herein may be made in the invention herein described, and to its uses herein described, without departing from the spirit of the invention particularly as defined in the following claims.

What is desired to be secured by Letters Patent follows. What is claimed is:

1. A bearing comprising:

a bearing component having a bearing contact surface;

a region at the bearing contact surface made of titanium aluminide; and a case-hardened layer at the surface of the titanium aluminide region, the case-hardened layer being formed by a diffusion of one or more interstitially diffusing elements in which one of the interstitially diffusing elements is carbon.

2. The bearing of claim 1, wherein the bearing component is a bearing race.

3. The bearing of claim 1, wherein the interstitially diffusing elements are selected from the group consisting of carbon, nitrogen, oxygen, boron, hydrogen and combinations thereof.

4. The bearing of claim 1, wherein the titanium aluminide is selected from the group consisting of an alpha-2 titanium aluminide and alloys thereof.

5. The bearing of claim 1, wherein the titanium aluminide is selected from the group consisting of gamma titanium aluminide and alloys thereof.

6. The bearing of claim 1, wherein the case-hardened layer is from about 0.010 to about 0.030 inches thick.

7. The bearing of claim 1, wherein the case-hardened layer has a hardness of at least about 60 Rc.

8. The bearing of claim 1, wherein the bearing component is made of titanium aluminide.

9. The bearing of claim 1, wherein the titanium aluminide region is a layer deposited upon a substrate comprising the bearing component.

10. The bearing of claim 1, wherein the case-hardened layer is formed by a process of exposing the titanium aluminide region to an atmosphere containing the one or more interstitially diffusing elements at elevated temperature and atmospheric pressure.

11. The bearing of claim 1, wherein the case-hardened layer is formed by a process of exposing the titanium aluminide region to an atmosphere containing the one or more interstitially diffusing elements at elevated temperature and reduced pressure.

12. A bearing comprising:

a bearing race having a bearing contact surface;

a region at the bearing contact surface made of a titanium aluminide selected from the group consisting of alpha-2 titanium aluminide, alloys of alpha-2 titanium aluminide, gamma titanium aluminide, and alloys of gamma titanium aluminide; and a case-hardened layer at least about 0.010 inch deep at the surface of the titanium aluminide region, the case-hardened layer containing an excess of at least one interstitial diffusing element, the at least one interstitial diffusing element being carbon and a possible additional interstitial diffusing element selected from the group consisting of nitrogen and oxygen, boron, hydrogen, and combinations thereof.

13. The bearing of claim 12, wherein the case-hardened layer is from about 0.010 to about 0.030 inches thick.

14. The bearing of claim 12, wherein the case-hardened layer has a hardness of at least about 60 Rc.

15. The bearing of claim 12, wherein the bearing race is made of titanium aluminide.

16. The bearing of claim 12, wherein the titanium aluminide region is a layer deposited upon a substrate comprising the bearing race.

17. The bearing of claim 12, wherein the case-hardened layer is formed by a process of exposing the titanium aluminide region to a carbonitriding atmosphere at elevated temperature and atmospheric pressure.

18. The bearing of claim 12, wherein the case-hardened layer is formed by a process of exposing the titanium aluminide region to an atmosphere containing the at least one interstitially diffusing element at elevated temperature and reduced pressure.

19. A bearing comprising:

a bearing race having a bearing contact surface, the bearing race being made of a titanium aluminide selected from the group consisting of alpha-2 titanium aluminide, alloys of alpha-2 titanium aluminide, gamma titanium aluminide, and alloys of gamma titanium aluminide; and a case-hardened layer at the bearing contact surface, the case-hardened layer being formed by a diffusion of at least one interstitial alloying element, the at least one interstitial diffusing element comprising carbon and one or more possible additional interstitial diffusing elements selected from the group consisting of nitrogen and oxygen, boron, hydrogen, and combinations thereof.

* * * * *